(12) United States Patent
Shin et al.

(10) Patent No.: US 10,696,265 B2
(45) Date of Patent: Jun. 30, 2020

(54) CURTAIN AIRBAG SYSTEM OF VEHICLE

(71) Applicants: Hyundai Motor Company, Seoul (KR); Kia Motors Corporation, Seoul (KR)

(72) Inventors: Hyo Shub Shin, Seoul (KR); Hyock In Kwon, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 184 days.

(21) Appl. No.: 15/953,871

(22) Filed: Apr. 16, 2018

(65) Prior Publication Data

US 2019/0106076 A1    Apr. 11, 2019

(30) Foreign Application Priority Data

Oct. 11, 2017 (KR) .......................... 10-2017-0131667

(51) Int. Cl.
*B60R 21/231* (2011.01)
*B60R 21/233* (2006.01)
(Continued)

(52) U.S. Cl.
CPC ...... *B60R 21/23138* (2013.01); *B60R 21/232* (2013.01); *B60R 21/233* (2013.01); *B60R 21/2338* (2013.01); *B60R 21/01554* (2014.10); *B60R 2021/0006* (2013.01); *B60R 2021/0034* (2013.01); *B60R 2021/0048* (2013.01); *B60R 2021/0058* (2013.01); *B60R 2021/01211* (2013.01); *B60R 2021/01286* (2013.01); *B60R 2021/23107* (2013.01); *B60R 2021/23308* (2013.01); *B60R 2021/23382* (2013.01); (Continued)

(58) Field of Classification Search
CPC ............ B60R 21/23138; B60R 21/232; B60R 21/233; B60R 21/2338; B60R 2021/23388; B60R 2021/23384; B60R 21/01554; B60R 2021/006; B60R 2021/01286; B60R 2021/0048; B60R 2021/23107; B60R 2021/23308; B60R 2021/23382; B60R 2021/0034; B60R 2021/01211; B60R 2021/0058
See application file for complete search history.

(56) References Cited

U.S. PATENT DOCUMENTS

| 6,422,593 | B1 * | 7/2002 | Ryan ..................... B60R 21/232 280/730.2 |
| 8,439,395 | B2 * | 5/2013 | Nagai ................. B60R 21/2346 280/729 |

(Continued)

FOREIGN PATENT DOCUMENTS

| JP | 5371157 B2 | 12/2013 |
| JP | 5992701 B2 | 9/2016 |

(Continued)

*Primary Examiner* — Karen Beck
(74) *Attorney, Agent, or Firm* — Mintz Levin Cohn Ferris Glovsky and Popeo, P.C.; Peter F. Corless

(57) ABSTRACT

A curtain airbag system of a vehicle is configured such that a position of an auxiliary chamber provided in a curtain airbag is changed to correspond to an occupant's seating posture or the occupant's lying posture in response to a vehicle collision, so that the occupant is safely protected in various seating postures.

13 Claims, 7 Drawing Sheets

(51) Int. Cl.
    *B60R 21/232*     (2011.01)
    *B60R 21/2338*    (2011.01)
    *B60R 21/015*         (2006.01)
    *B60R 21/00*          (2006.01)
    *B60R 21/01*          (2006.01)

(52) U.S. Cl.
    CPC .............. *B60R 2021/23384* (2013.01); *B60R 2021/23388* (2013.01)

(56) References Cited

U.S. PATENT DOCUMENTS

| | | | |
|---|---|---|---|
| 9,296,353 B1* | 3/2016 | Choi | B60R 21/01554 |
| 9,682,681 B1* | 6/2017 | Patel | B60R 21/239 |
| 2018/0050652 A1* | 2/2018 | Jung | B60R 21/232 |
| 2018/0079382 A1* | 3/2018 | Yoo | B60R 21/239 |
| 2019/0106076 A1* | 4/2019 | Shin | B60R 21/23138 |
| 2019/0111880 A1* | 4/2019 | Choi | B60R 21/205 |
| 2019/0118759 A1* | 4/2019 | Kobayashi | B60R 21/23138 |
| 2019/0161051 A1* | 5/2019 | Gwon | B60R 21/235 |
| 2019/0176744 A1* | 6/2019 | Yoo | B60R 21/23138 |
| 2019/0193666 A1* | 6/2019 | Jost | B60R 21/01512 |
| 2019/0241148 A1* | 8/2019 | Shin | B60R 21/214 |

FOREIGN PATENT DOCUMENTS

| | | | |
|---|---|---|---|
| KR | 20060034319 A | 4/2006 | |
| KR | 20170055030 A | 5/2017 | |
| WO | WO-2017208811 A1 * | 12/2017 | ....... B60R 21/23138 |

* cited by examiner

CURTAIN AIRBAG SYSTEM OF VEHICLE

CROSS REFERENCE TO RELATED APPLICATION

The present application claims under 35 U.S.C. § 119(a) the benefit of Korean Patent Application No. 10-2017-0131667, filed Oct. 11, 2017, the entire contents of which are incorporated by reference herein.

BACKGROUND

1. Technical Field

The present disclosure relates generally to a curtain airbag system of a vehicle, more particularly, to a curtain airbag system configured to protect an occupant from side impact.

2. Description of the Related Art

A vehicle is provided with various airbags to protect an occupant from impact. Among these airbags, a curtain airbag that protects the occupant from side impact of the vehicle is provided in a longitudinal direction along a side of a roof panel to absorb shock transmitted to the occupant in the event of a collision and to prevent the occupant from being catapulted out of the vehicle.

However, since a conventional curtain airbag is configured to be simply deployed downward to absorb impact transmitted to an occupant when a collision occurs, it is impossible to sufficiently prevent the occurrence of injury caused when the upper body of the occupant hits a door trim.

As autonomous vehicles have become more popular, the occupant may assume a lying posture by tilting the seatback backward. If the occupant maintains the lying posture, it is impossible to safely protect the lying occupant from side impact as the occupant is outside the protection range of the conventional curtain airbag.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a curtain airbag system of a vehicle, in which an occupant is safely protected regardless of seating posture.

In order to achieve the above object, according to one aspect of the present disclosure, there is provided a curtain airbag system of a vehicle, the curtain airbag system including: a curtain airbag provided to extend in forward and backward directions of a vehicle body and disposed at a side of an occupant when inflated, and provided with a main chamber to protect the occupant from side impact; an auxiliary chamber provided in the curtain airbag, and configured to be disposed at a side of an upper body of the occupant or at a side of a head thereof when inflated according to a seating mode angle or a resting mode angle of a seatback angle; and a chamber moving mechanism provide in the vehicle body, provided with a connection tether connected to the auxiliary chamber to determine an inflation position of the auxiliary chamber, and configured to cut or uncut the connection tether according to the seatback angle such that the auxiliary chamber is disposed to correspond to a posture of the occupant.

The chamber moving mechanism may include: the connection tether configured such that a first end thereof is connected to the vehicle body or the curtain airbag and a second end thereof is connected to the auxiliary chamber; and a cutter provided at a vehicle body side to cut the connection tether.

The auxiliary chamber may be inflated upward to be disposed at the side of the head of the occupant at the resting mode angle of the seatback, and the connection tether may be configured such that a first end thereof is connected to the vehicle body or an upper portion of the curtain airbag and a second end thereof extends from a side opposite to a side at which the auxiliary chamber is provided based on the curtain airbag and then is connected to the auxiliary chamber while extending in an oblique direction toward a front lower portion of the curtain airbag, whereby the auxiliary chamber is pulled in a front lower direction by the connection tether to be disposed at the side of the upper body of the occupant in an occupant's seating posture.

The connection tether may be configured such that the first end thereof is connected to the upper portion of the curtain airbag behind the auxiliary chamber, and the second end thereof is connected to the auxiliary chamber by passing from a lower portion of the curtain airbag to a front of the auxiliary chamber.

The curtain airbag may be provided at a lower end thereof with a through-hole with the connection tether passing therethrough.

The curtain airbag may be provided at a lower end thereof with a planar extension chamber by extending therefrom, and the extension chamber may be provided with a through-hole at a point on a surface thereof.

The extension chamber may be configured to be inflatable and to be communicable with the main chamber, thereby being inflated along with the main chamber when the main chamber is inflated.

The extension chamber may be configured to be disposed at the side of the upper body of the occupant at the seating mode angle of the seatback, and to be disposed closer to the occupant than the auxiliary chamber when inflated.

The curtain airbag may be provided with a stopper tether configured such that a first end thereof is connected to the auxiliary chamber and a second end thereof is connected to the curtain airbag while being spaced apart from the auxiliary chamber, whereby the auxiliary chamber is remained to be disposed at the side of the head of the occupant at the resting mode angle of the seatback when inflated in a state where the connection tether is cut by the chamber moving mechanism.

The main chamber may be inflated by being supplied with gas from an inflator, and the auxiliary chamber may communicate with the main chamber to be inflated by being supplied with the gas from the main chamber.

The main chamber and the auxiliary chamber may be inflated by being supplied with gas from respective inflators, the respective inflators and the chamber moving mechanism may be operated by control of a controller, and the controller may receive information on the seatback angle and receive a signal in response to a vehicle collision, and may be configured to operate the inflators of the main chamber and the auxiliary chamber when the signal in response to the vehicle collision is input and to control the chamber moving mechanism to cut or uncut the connection tether according to the seatback angle.

The controller may be configured to operate the inflators of the main chamber and the auxiliary chamber and to control the chamber moving mechanism to cut the connection tether when the signal in response to the vehicle collision is input at the resting mode angle of the seatback.

The controller may be configured to operate the inflators of the main chamber and the auxiliary chamber and to control the chamber moving mechanism to uncut the connection tether when the signal in response to the vehicle collision is input at the seating mode angle of the seatback.

The auxiliary chamber may be inflated downward to be disposed at the side of the head of the occupant at the resting mode angle of the seatback, and the connection tether may be configured such that a first end thereof is connected to a front of the curtain airbag and a second end thereof is connected to the auxiliary chamber, whereby the auxiliary chamber is pulled in a forward direction by the connection tether to be disposed at the side of the upper body of the occupant at the seating mode angle of the seatback.

According to the present disclosure, since the curtain airbag system is configured such that the position of the auxiliary chamber provided in the curtain airbag is changed to correspond to the occupant's seating posture or the occupant's lying posture in response to the vehicle collision, the occupant is safely protected regardless of seating postures.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

A curtain airbag system of a vehicle according to exemplary embodiments of the present disclosure will be described in more detail with reference to the accompanying drawings.

Figure 1:
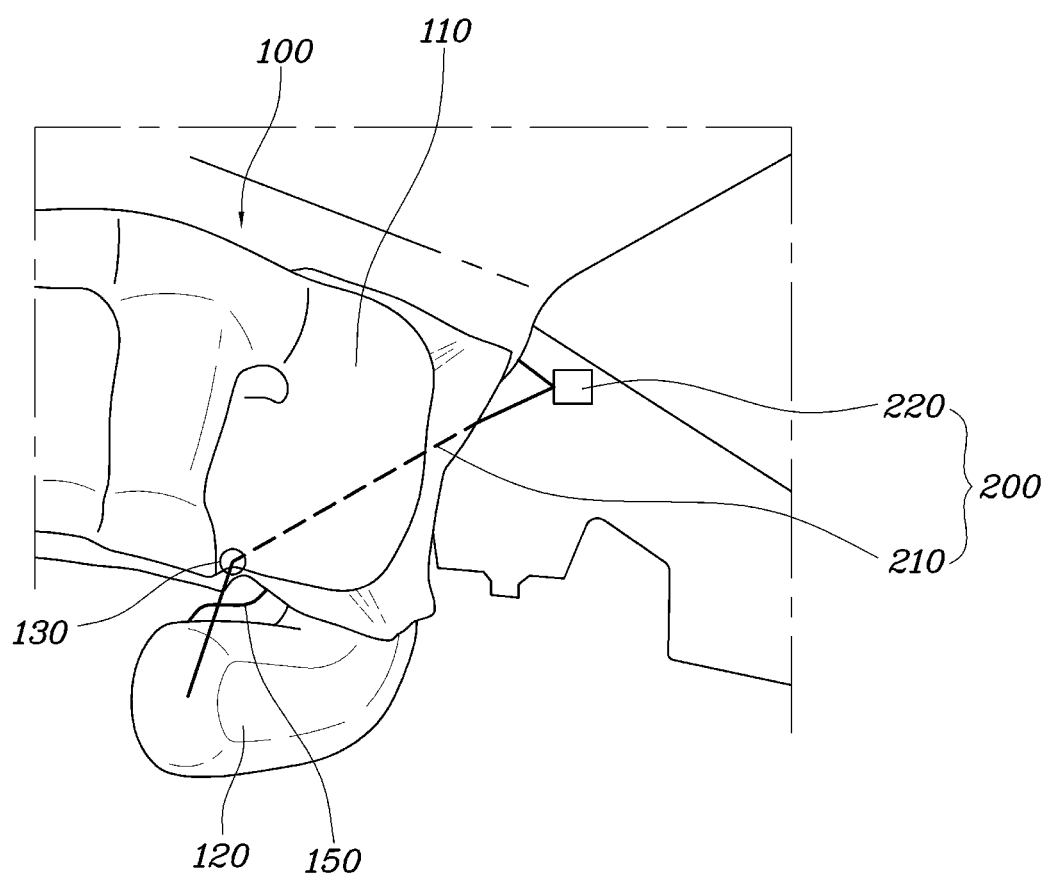
FIGS. 1 to 2 are views showing a curtain airbag system of a vehicle according to the present disclosure.
Figure 2:
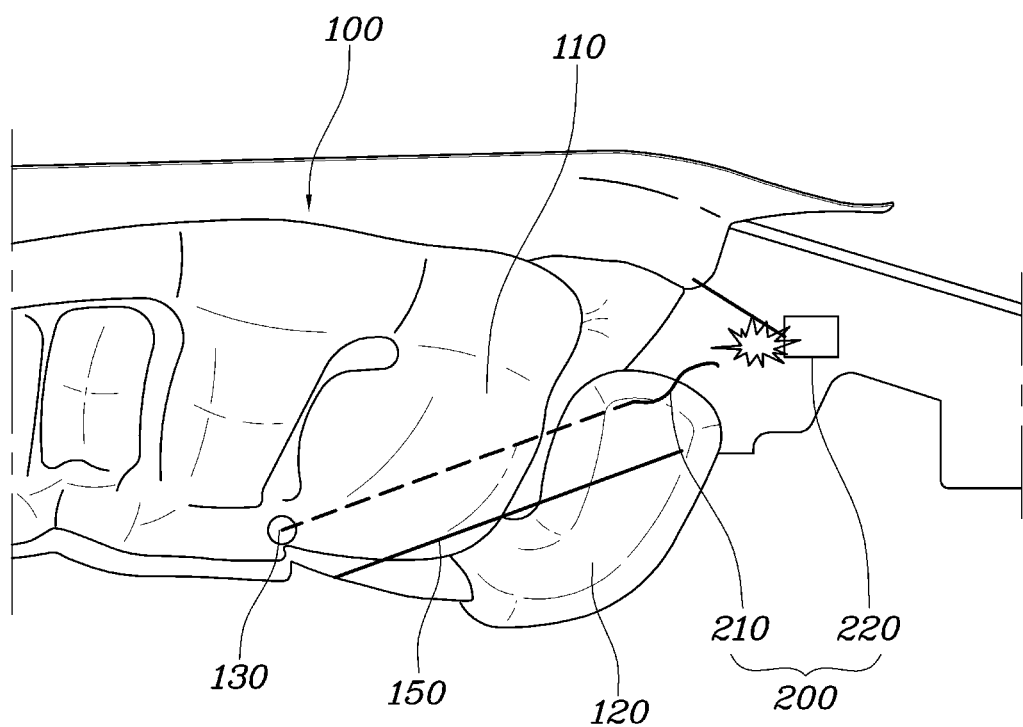

FIGS. 1 to 2 are views showing a curtain airbag system of a vehicle according to the present disclosure; and FIGS. 3 to 7 are views showing various embodiments of the curtain airbag system shown in FIG. 1.

As shown in FIGS. 1 to 2, a curtain airbag system of a vehicle according to the present disclosure includes: a curtain airbag 100 provided to extend in forward and backward directions of a vehicle body and disposed at a side of an occupant when inflated, and provided with a main chamber 110 to protect the occupant from side impact; an auxiliary chamber 120 provided in the curtain airbag 100, and configured to be disposed at a side of an upper body of the occupant or at a side of a head thereof when inflated according to a seating mode angle or a resting mode angle of a seatback angle; and a chamber moving mechanism 200 provide in the vehicle body, provided with a connection tether 210 connected to the auxiliary chamber 120 to determine an inflation position of the auxiliary chamber 120, and configured to cut or uncut the connection tether 210 according to the seatback angle such that the auxiliary chamber 120 is disposed to correspond to a posture of the occupant.

The curtain airbag 100 according to the present disclosure, which is provided along the side of the ceiling or roof panel inside the vehicle and is deployed downward and disposed between a door and an occupant, is provided with the main chamber 110 to protect the occupant and the auxiliary chamber 120. The main chamber 110 may be provided in such a way that a plurality of main chambers is provided along a longitudinal direction of the curtain airbag 100, and may be disposed to correspond to a front seat occupant and a rear seat occupant.

When inflated, the auxiliary chamber 120 is configured to be disposed at the side of the upper body of the occupant or at the side of the head of the occupant in the occupant's lying posture according to the seatback angle. As provided herein, the seatback angle is divided into a seating mode angle and a resting mode angle, wherein the seating mode angle is the seatback angle corresponding to the occupant's seating posture, and the resting mode angle is the seatback angle corresponding to the occupant's lying posture. Therefore, the seating mode angle may be determined such that the waist of the occupant is vertically erected, and the resting mode angle may be determined such that the waist of the occupant is horizontally stretched. The seating mode angle and the resting mode angle are determined by the posture of the occupant and are not limited to any one angle.

In order to maintain the occupant's seating posture, the seatback is at the seating mode angle where the seatback is raised, and in particular, the occupant's upper body is raised, so that the occupant's head is safely protected by the main chamber 110 provided in the curtain airbag 100. Meanwhile, in order to maintain the occupant's lying posture, the seatback is at the resting mode angle where the seatback is tilted backward, and in particular, the occupant's upper body is moved backward and downward. In this case, since the upper body and the head of the occupant may be outside the protection range of the main chamber 110 provided in the curtain airbag 100, the position of the auxiliary chamber 120 is moved to allow the occupant to be safely protected from impact even in the lying posture. Therefore, the auxiliary chamber 120 may be positioned at the lower side of the main chamber 110 when the occupant is seated, and may be positioned rearward and lower than the main chamber 110 when the occupant is lying down.

As described above, the occupant's seating posture and the occupant's lying posture depend on the angle of the seatback, and the initially set inflation position of the auxiliary chamber 120 may be disposed at one of the side of the upper body of the occupant in the occupant's seating posture, and the side of the head of the occupant in the occupant's lying posture.

The connection tether 210 is connected to the auxiliary chamber 120, and is selectively cut by the chamber moving mechanism 200. In other words, the initially set inflation position of the auxiliary chamber 120 is disposed at the side of the upper body of the occupant at the seating mode angle of the seatback or the side of the head of the occupant at the resting mode angle of the seatback, wherein the connection tether 210 is connected to the auxiliary chamber 120, whereby as the auxiliary chamber 120 is pulled, the inflation position of the auxiliary chamber 120 is changed to the side of the head of the occupant in the occupant's lying posture or the side of the upper body of the occupant in the occupant's seating posture. In particular, since the connection tether 210 is cuttable by the chamber moving mechanism 200, it is determined whether the auxiliary chamber 120 is to be deployed to an initial set position or to a changed position by the connection tether 210 being cut or uncut according to the seatback angle. For example, assuming that the initially set inflation position of the auxiliary chamber 120 is disposed at the side of the upper body of the occupant in the seating mode angle of the seatback and the inflation position of the auxiliary chamber 120 is disposed at the side of the head of the occupant at the resting mode angle of the seatback by the connection tether 210, in the case of the seating mode angle of the seatback, when the curtain airbag 100 is deployed due to a vehicle collision, the auxiliary chamber 120 is inflated along with the main chamber 110 and the connection tether 210 is cut, such that the inflation position of the auxiliary chamber 120 is disposed at the side of the head of the occupant, the initially set inflation position, in the seating mode angle of the seat. Accordingly, the auxiliary chamber 120 is disposed at the side of the upper body of the occupant at the seating mode angle of the seat, whereby it is possible to protect the occupant from impact.

On the contrary, in the state where the initially set inflation position and the changed inflation position of the auxiliary chamber 120 are the same as above, when the seatback angle is the resting mode angle, the connection tether 210 is uncut such that the inflation position of the auxiliary chamber 120 is changed by the connection tether 210, and the auxiliary chamber 120 is deployed toward the side of the head of the occupant lying on the seat at the resting mode angle of the seatback, whereby the occupant can be safely protected through the auxiliary chamber 120 in the lying posture.

The above described chamber moving mechanism 200 includes: the connection tether 210 configured such that a first end thereof is connected to the vehicle body or the curtain airbag 100 and a second end thereof is connected to the auxiliary chamber 120; and a cutter 220 provided at a vehicle body side to cut the connection tether 210.

In other words, the chamber moving mechanism 200 is constituted by the connection tether 210 and the cutter 220, wherein the connection tether 210 is connected to the auxiliary chamber 120 to provide a pulling force in the state of being fixed to the vehicle body or the curtain airbag 100, such that the inflation position of the auxiliary chamber 120 is changed. The curtain airbag 100, to which the first end of the connection tether 210 is connected, may be a panel supporting the main chamber 110. The cutter 220 is connected to the connection tether 210, and the cutter 220 is configured to be capable of cutting the connection tether 210, thereby selectively cutting the connection tether 210 according to the occupant posture. The cutter 220 is operated by control of a controller 300 to be described hereinbelow, as the controller 300 determines whether a vehicle collision occurs or not and determines the seatback angle, it is determined whether or not the cutter is operated. As provided herein, a method of transmitting the connection tether 210 using a cutting blade and an electromagnet may be applied to the cutter 220, and a technique of cutting the tether according to a signal input is well known and a detailed description thereof is omitted.

In particular, the auxiliary chamber 120 may be inflated upward to be disposed at the side of the head of the occupant at the resting mode angle of the seatback. In other words, as shown in FIG. 2, the auxiliary chamber 120 is configured to be inflated upward from the rear end of the curtain airbag 100 when inflated, thereby creating a protection zone of the main chamber 110 and an additional protection zone. The auxiliary chamber 120 is configured such that the initially set inflation position is to be disposed at the side of the head of the occupant lying on the seat at the resting mode angle of the seatback, which may be determined by the shape of the auxiliary chamber 120.

In particular, the connection tether 210 may be configured such that the first end thereof is connected to the vehicle body or an upper portion of the curtain airbag 100 and the second end thereof extends from a side opposite to a side at which the auxiliary chamber 120 is provided based on the curtain airbag 100 and then is connected to the auxiliary chamber while extending in an oblique direction toward a front lower portion of the curtain airbag 100, whereby the auxiliary chamber 120 is pulled in a front lower direction by the connection tether 210 to be disposed at the side of the upper body of the occupant in the occupant's seating posture.

As described above, the auxiliary chamber 120 should be configured such that the inflation position is changed to correspond to the occupant's lying posture and the occupant's seating posture, and the inflation position may be changed by the connection tether 210. In other words, the initially set inflation position of the auxiliary chamber 120 is disposed at the side of the head of the occupant lying on the seat at the resting mode angle of the seatback, and the inflation position of the auxiliary chamber 120 is changed to be disposed at the side of the upper body of the occupant seated on the seat at the seating mode angle of the seatback by being pulled by the connection tether 210 connected to the auxiliary chamber 120. To achieve this, as shown in FIG. 1, the connection tether 210 is configured such that the first end thereof is connected to the vehicle body at the upper portion of the curtain airbag 100, and the second end thereof extends from the curtain airbag 100 to a direction opposite to a side at which the auxiliary chamber 120 is provided and then is connected to the auxiliary chamber 120 by passing from a lower portion of the curtain airbag 100 to a front of the auxiliary chamber. Therefore, the position of the auxiliary chamber 120 may be changed from the initially set position at which the auxiliary chamber is inflated upward to a different position by being pulled by the connection tether 210.

As shown in FIG. 1, the connection tether 210 is configured such that the first end thereof is connected to the upper portion of the curtain airbag 100 behind the auxiliary chamber 120, and the second end thereof is connected to the auxiliary chamber 120 by passing from a lower portion of the curtain airbag 100 to a front of the auxiliary chamber 120.

In other words, in the case of the resting mode angle of the seatback, the occupant's upper body is moved backward, and in the case of the seating mode angle of the seatback, the occupant's upper body is moved forward, so the auxiliary chamber 120 is moved forward more than the initially set inflation position. Therefore, the connection tether 210 is configured such that the first end thereof is connected to a location behind the auxiliary chamber 120, and the second end thereof is connected to a location in front of the auxiliary chamber 120, whereby when the auxiliary chamber 120 is pulled forward, the inflation position of the auxiliary chamber 120 is changed to the side of the upper body of the occupant in the occupant's seating posture.

Preferably, the curtain airbag 100 may be provided at a lower end thereof with a through-hole 130 with the connection tether 210 passing therethrough. As described above, the curtain airbag 100 is provided with the through-hole 130 that is disposed at a location in front of the auxiliary chamber 120 and through which the connection tether 210 passes, so the first end of the connection tether 210 is connected to the vehicle body and the second end thereof passes through the through-hole 130 and is stopped thereby to be connected to the auxiliary chamber 120, whereby the auxiliary chamber 120 can be pulled forward, and the location of the connection tether 210 is fixed, so the auxiliary chamber 120 is pulled in a predetermined direction such that the auxiliary chamber 120 is disposed at the side of the upper body of the occupant in the occupant's seating posture.

Figure 3:
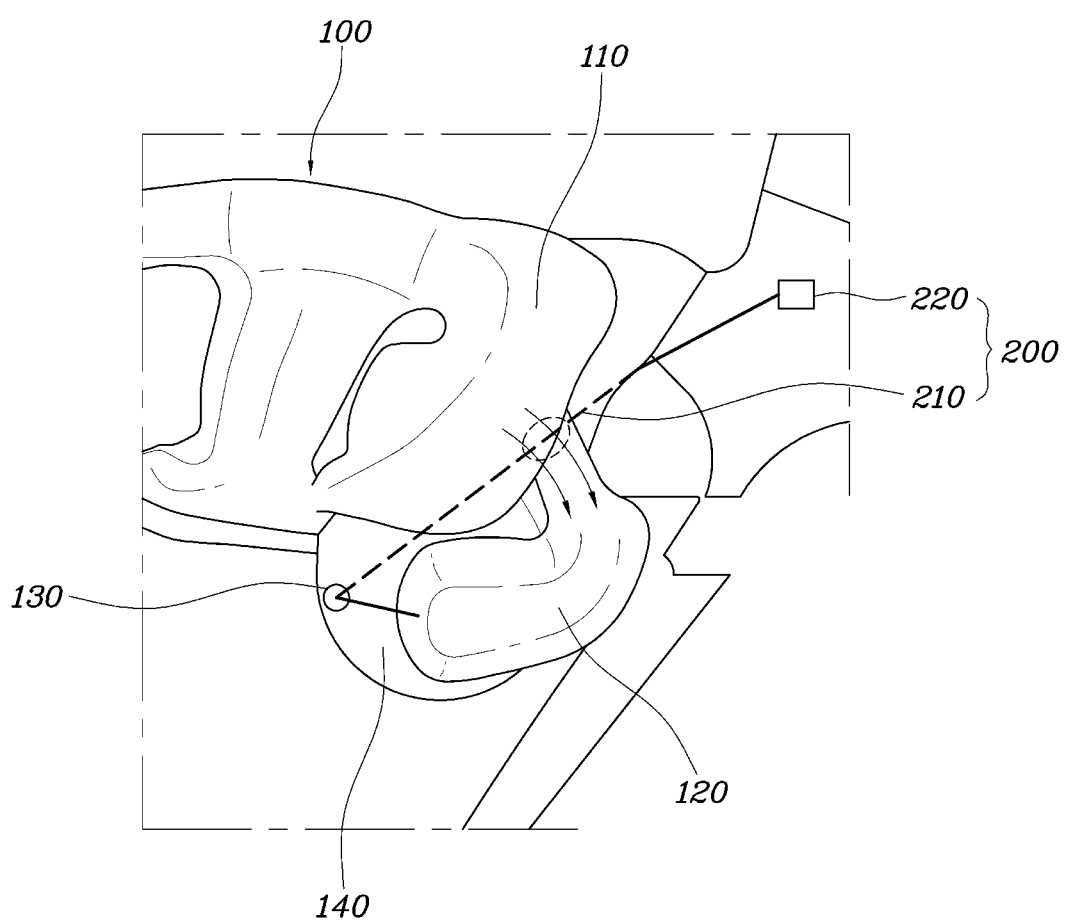
FIGS. 3 to 7 are views showing various embodiments of the curtain airbag system shown in FIG. 1.

Meanwhile, as shown in FIG. 3, the curtain airbag 100 may be provided at a lower end thereof with a planar extension chamber 140 by extending therefrom, and the extension chamber 140 may be provided with the through-hole 130 at a point on a surface thereof.

As described above, at the lower end of the curtain airbag 100, the planar extension chamber 140 having a predetermined width is provided, and the through-hole 130 is formed at a predetermined point on the surface of the extension chamber 140, whereby the direction in which the auxiliary chamber 120 is pulled by the connection tether 210 can be set differently depending on the position of the through-hole 130. As described above, since the inflation position of the auxiliary chamber 120 is adjustable, it is possible to set an optimized inflation position corresponding to the occupant's upper body in the occupant's seating posture according to the seatback angle.

Figure 4:
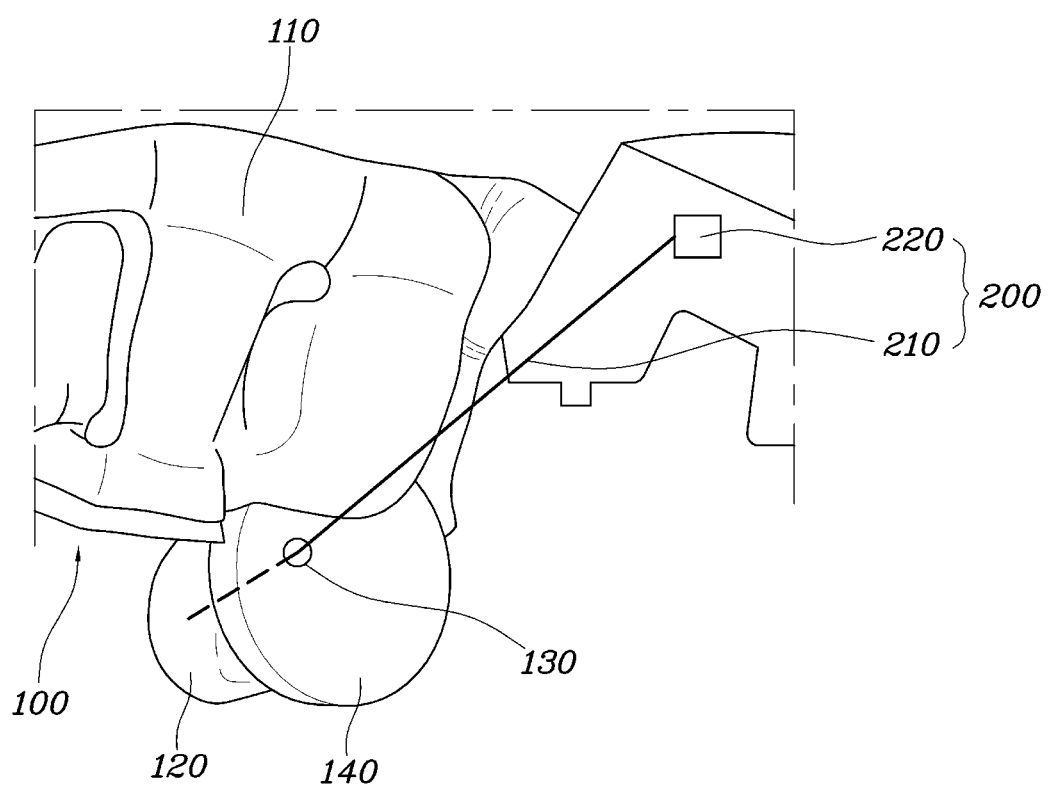
Figure 5:
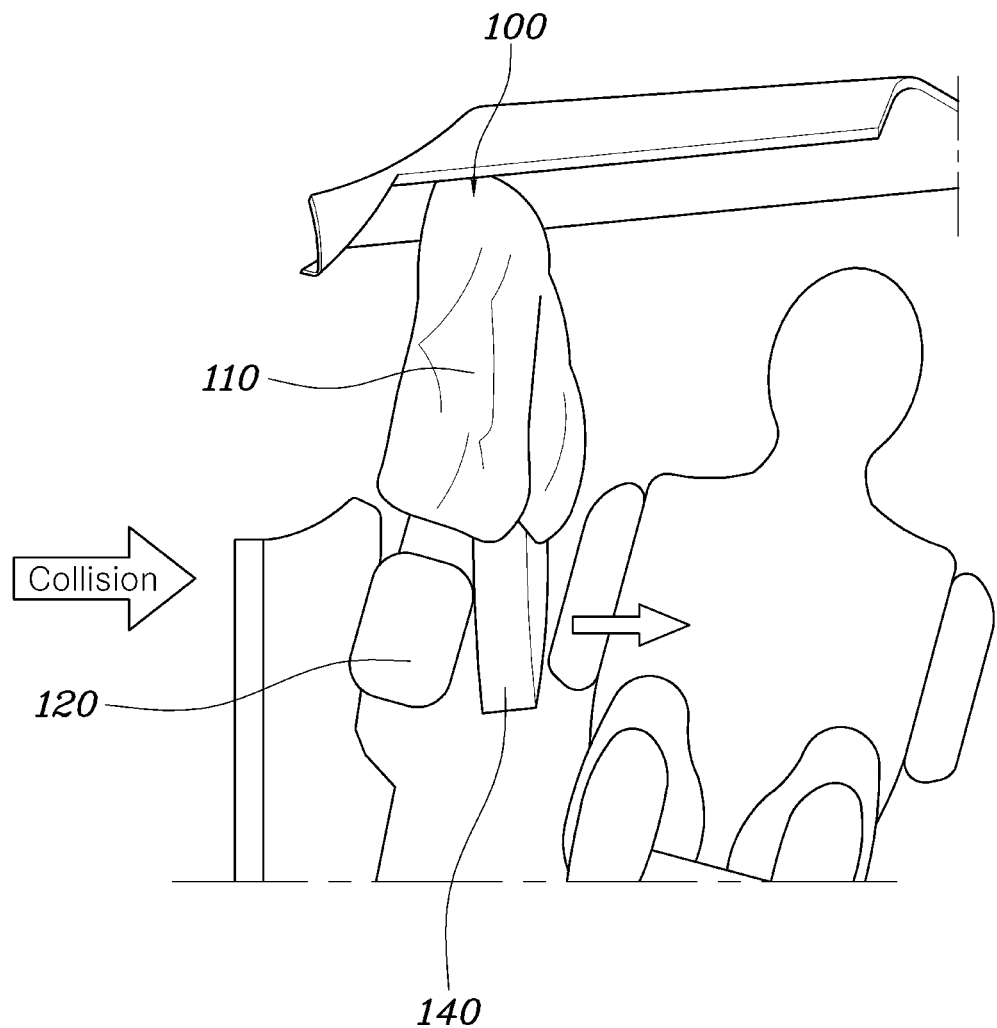

Meanwhile, as shown in FIGS. 4 to 5, the extension chamber 140 may be configured to be inflatable and to be communicable with the main chamber 110, thereby being inflated along with the main chamber when the main chamber 110 is inflated.

The extension chamber 140 may be configured to be disposed at the side of the upper body of the occupant at the seating mode angle of the seatback, and to be disposed closer to the occupant than the auxiliary chamber 120 when inflated.

As described above, since the extension chamber 140 is configured to be inflatable, it is possible to protect the occupant from impact in cooperation with the auxiliary chamber 120, and as the occupant is moved in the opposite direction of the door side by the inflation of the extension chamber 140, the occupant's protective space can be secured.

In other words, in the event of side impact of a vehicle, the door is strong enough to push the occupant, so both the auxiliary chamber 120 and the extension chamber 140 are inflated to move the occupant from the door and to absorb the impact, whereby it is possible to further protect the occupant safely.

Preferably, the extension chamber 140 is disposed closer to the occupant than the auxiliary chamber 120. In the present disclosure, the extension chamber 140 is formed with the through-hole 130 to serve as a guide for the connection tether 210, so the volume of the extension chamber when inflated is set to be less than that of the auxiliary chamber 120. Accordingly, the auxiliary chamber 120 having a large volume when inflated is disposed closer to the door to absorb direct impact, and the extension chamber 140 having a small volume is disposed closer to the occupant to move the occupant from the door and to protect the occupant from the impact.

Meanwhile, as shown in FIGS. 1 to 2, the curtain airbag 100 may be provided with a stopper tether 150 configured such that a first end thereof is connected to the auxiliary chamber 120 and a second end thereof is connected to the curtain airbag 100 while being spaced apart from the auxiliary chamber 120, whereby the auxiliary chamber 120 remains disposed at the side of the head of the occupant at the resting mode angle of the seatback when inflated in a state where the connection tether 210 is cut by the chamber moving mechanism 200.

As described above, the stopper tether 150 is configured such that the second end thereof is connected to the curtain airbag 100 while being spaced apart from the front of the auxiliary chamber 120 from the curtain airbag 100, and the first end thereof is connected to the auxiliary chamber 120, whereby when the auxiliary chamber 120 is moved to the side of the head of the occupant lying on the seat at the resting mode angle of the seatback as the connection tether 210 is cut by the chamber moving mechanism 200, it is possible to restrict the auxiliary chamber 120 from being excessively moved. In other words, referring to FIG. 2, when the auxiliary chamber 120 is inflated in a state where the connection tether 210 is cut, the auxiliary chamber 120 is moved to the side of the head of the occupant, the initially set inflation position at the resting mode angle of the seatback. Thus, the auxiliary chamber 120 to be inflated may be excessively moved to fail to be disposed at the side of the head of the occupant. To solve this problem, the stopper tether 150 is connected to the auxiliary chamber 120, whereby when the auxiliary chamber 120 is disposed at the side of the head of the occupant lying on the seat at the resting mode angle of the seatback, it is possible to restrict the auxiliary chamber 120 from being moved at the position, so that the auxiliary chamber 120 can be positioned in place.

The stopper tether 150 may be adjusted in installation position according to the occupant's head position at the resting mode angle of the seatback.

Meanwhile, in the present disclosure, the main chamber 110 may be inflated by being supplied with gas from an inflator I, and the auxiliary chamber 120 may communicate with the main chamber 110 to be inflated by being supplied with the gas from the main chamber 110.

As described above, the main chamber 110 is first developed as it is inflated by being directly supplied with the gas from the inflator I, and the auxiliary chamber 120 is inflated by being supplied with the gas from the main chamber 110, so it is possible to protect the occupant in cooperation with the main chamber 110. In other words, in the case of the curtain airbag 100, the curtain airbag 100 can be fully deployed and positioned in place only when the main chamber 110 is inflated, whereby the auxiliary chamber 120 can be positioned in place. Accordingly, the gas from the inflator I should inflate the main chamber 110, and then is moved to the auxiliary chamber 120 to inflate the auxiliary chamber 120.

As another embodiment, the main chamber 110 and the auxiliary chamber 120 may be inflated by being supplied with gas from respective inflators I, and the respective inflators I and the chamber moving mechanism 200 may be operated by control of the controller 300. Therefore, the main chamber 110 and the auxiliary chamber 120 are provided separately in the curtain airbag 100, and are inflated by being supplied with gas from the respective inflators I.

The controller 300 controlling the inflator I and the chamber moving mechanism 200 receives information on the seatback angle to determine the posture of the occupant, and receives a signal in response to a vehicle collision. The controller 300 may receive information from a sensor that senses an angle according to the amount of tilting of the seatback and receive information from a sensor that detects an external obstacle, thereby determining whether the vehicle collides and determining the angle of the seatback.

Through this, when the signal in response to the vehicle collision is input, the controller 300 operates the inflators I of the main chamber 110 and the auxiliary chamber 120 and controls the chamber moving mechanism 200 to cut or uncut the connection tether 210 according to the seatback angle, whereby it is possible for the auxiliary chamber 120 to safely protect the occupant being seated or lying on the seat according to the seatback angle.

In particular, the controller 300 may be configured to operate the inflators I of the main chamber 110 and the auxiliary chamber 120 and to control the chamber moving mechanism 200 to cut the connection tether 210 when the signal in response to the vehicle collision is input at the resting mode angle of the seatback.

As described above, when the seatback is at the resting mode angle and a vehicle collision is expected, the controller 300 operates the inflators I such that both the main chamber 110 and the auxiliary chamber 120 are inflated, and controls the chamber moving mechanism 200 to cut the connection tether 210, whereby as shown in FIG. 2, the auxiliary chamber 120 can be positioned at the side of the head of the occupant in the occupant's lying position.

On the contrary, the controller 300 may be configured to operate the inflators I of the main chamber 110 and the auxiliary chamber 120 and to control the chamber moving mechanism 200 to uncut the connection tether 210 when the signal in response to the vehicle collision is input at the seating mode angle of the seatback.

As described above, when the seatback is at the seating mode angle and a vehicle collision is expected, the controller 300 operates the inflators I such that both the main chamber 110 and the auxiliary chamber 120 are inflated, and controls the chamber moving mechanism 200 to uncut the connection tether 210, whereby the main chamber 110 and the auxiliary chamber 120 are deployed simultaneously, and the auxiliary chamber 120 is pulled by the connection tether 210 to be disposed at the side of the upper body of the occupant in the occupant's seating posture.

The controller may adjust the deployment timing through individual control of an inflator I supplying gas to the main chamber 110 and an inflator I supplying gas to the auxiliary chamber 120 in order to set the appropriate deployment timing according to the direction of impact and occupant posture.

The auxiliary chamber 120 of the present disclosure may be applied to the rear seat occupant. In other words, in the rear seat, when the occupant remains lying on the seat, the occupant may be outside the protection zone of the main chamber 110 even if the curtain airbag 100 is deployed, and thus, the auxiliary chamber 120 may be inflated in cooperation with the main chamber 110 disposed at the rear end of the curtain airbag 100.

Meanwhile, in the front seat, to ensure safety, the auxiliary chamber 120 may be provided.

Figure 6:
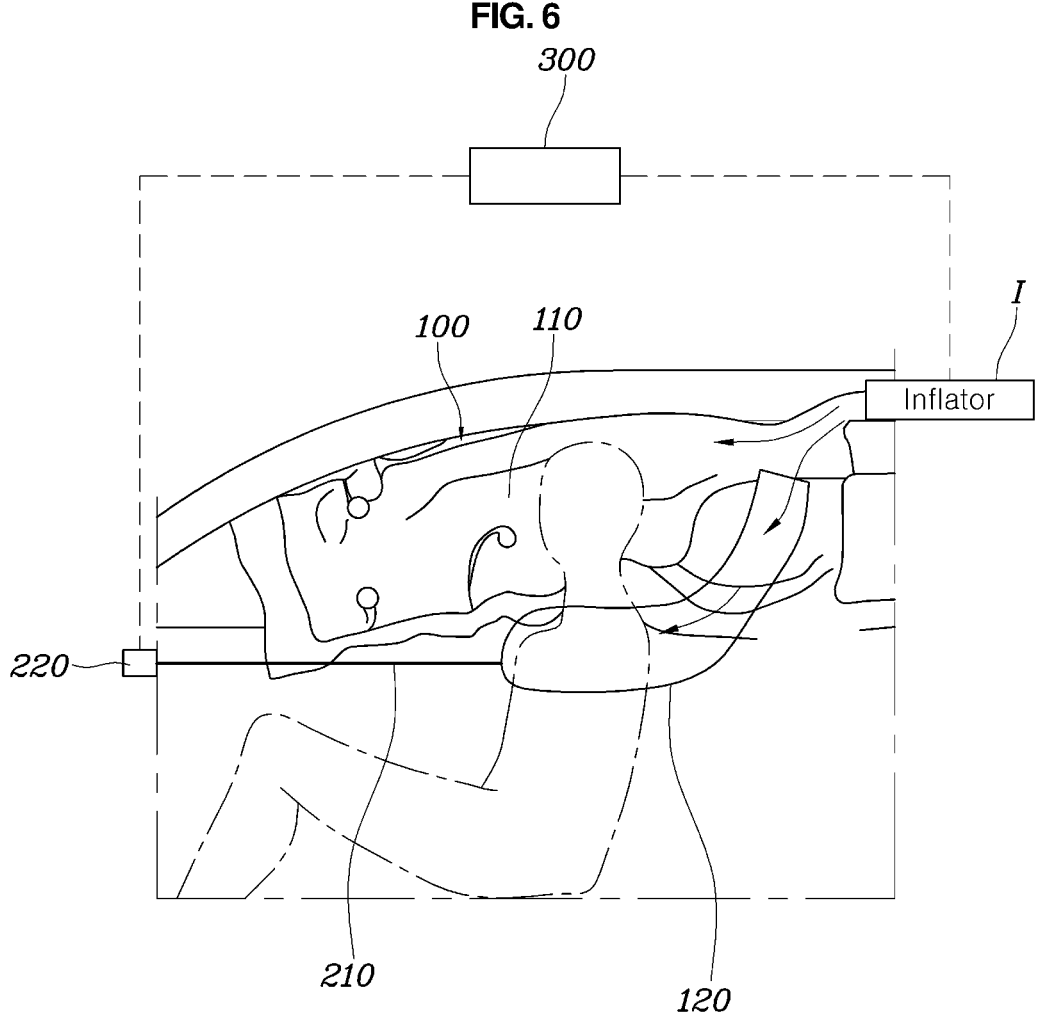
Figure 7:
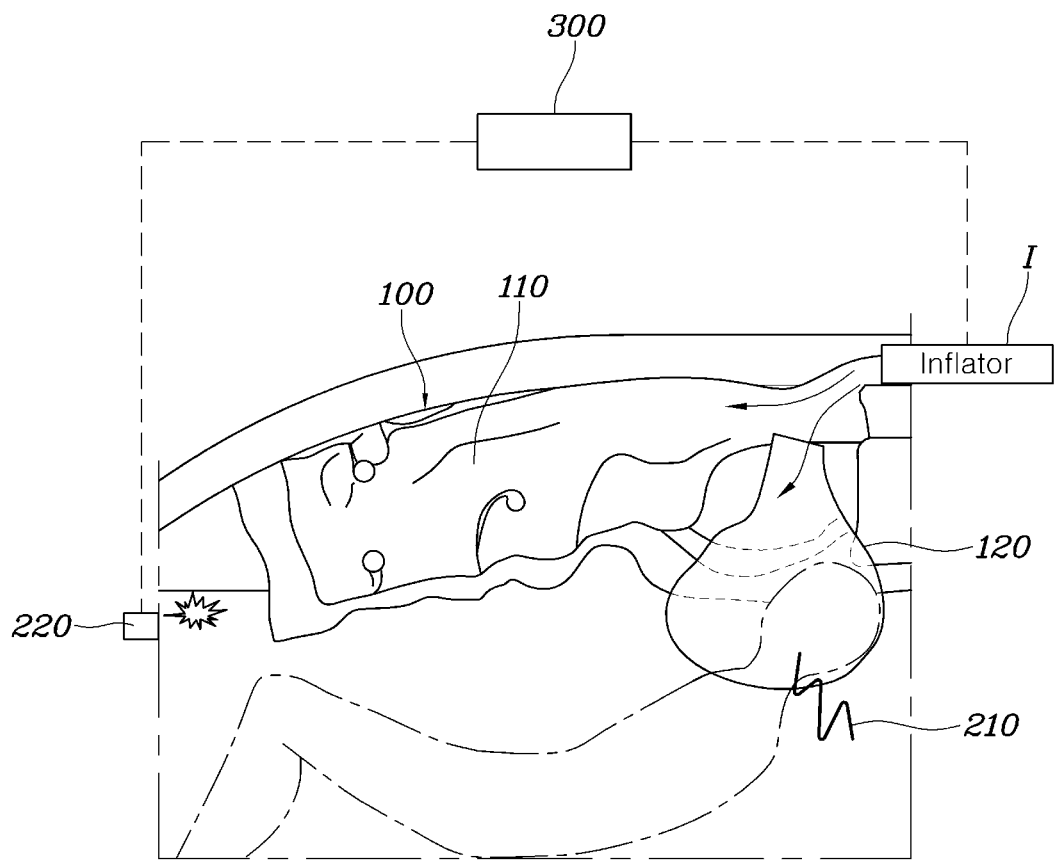

In particular, as shown in FIGS. 6 to 7, the auxiliary chamber 120 is configured to be inflated downward to be disposed at the side of the head of the occupant at the resting mode angle of the seatback. The auxiliary chamber 120 is configured such that the initially set inflation position is to be disposed at the side of the head of the occupant at the resting mode angle of the seatback, which may be determined by the shape of the auxiliary chamber 120.

The connection tether 210 may be configured such that a first end thereof is connected to a front of the curtain airbag 100 and a second end thereof is connected to the auxiliary chamber 120, whereby the auxiliary chamber 120 is pulled in a forward direction by the connection tether 210 to be disposed at the side of the upper body of the occupant at the seating mode angle of the seatback.

In other words, the initially set inflation position of the auxiliary chamber 120 is disposed at the side of the head of the occupant lying on the seat at the resting mode angle of the seatback, and since the auxiliary chamber 120 is connected to be pulled by the connection tether 210, the inflation position of the auxiliary chamber 120 is changed to be position at the side of the upper body of the occupant at the seating mode angle of the seatback. To achieve this, as shown in FIG. 6, the connection tether 210 is configured such that the first end thereof is connected to the front of the curtain airbag 100 and the second end thereof is connected to the auxiliary chamber 120, whereby the auxiliary chamber 120 is pulled in a forward direction by the connection tether 210 to be disposed at the side of the upper body of the occupant at the seating mode angle of the seatback.

When the connection tether 210 is cut by the chamber moving mechanism 200, as shown in FIG. 7, a pulling force applied to the auxiliary chamber 120 is eliminated, and accordingly, the auxiliary chamber 120 is deployed only in a downward direction, so the auxiliary chamber can be disposed at the side of the head of the occupant at the resting mode angle of the seatback.

Therefore, the occupant is protected safely through the auxiliary chamber 120 in both lying and seating postures, so safety of the occupant is secured.

The curtain airbag system of a vehicle configured as described above is configured such that the position of the auxiliary chamber provided in the curtain airbag is changed to correspond to the occupant's seating posture or the occupant's lying posture in response to the vehicle collision, whereby the occupant is safely protected regardless of seating postures.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A curtain airbag system of a vehicle, comprising:
    a curtain airbag provided to extend in forward and backward directions of a vehicle body and disposed at a side of an occupant when inflated, and provided with a main chamber to protect the occupant from side impact;
    an auxiliary chamber provided in the curtain airbag, and configured to be disposed at a side of an upper body of the occupant or at a side of a head thereof when inflated according to a seating mode angle or a resting mode angle of a seatback angle; and
    a chamber moving mechanism provide in the vehicle body, provided with a connection tether connected to the auxiliary chamber to determine an inflation position of the auxiliary chamber, and configured to cut or uncut the connection tether according to the seatback angle such that the auxiliary chamber is disposed to correspond to a posture of the occupant,
    wherein the auxiliary chamber is inflated upward to be disposed at the side of the head of the occupant at the resting mode angle of the seatback, and
    wherein the connection tether is configured such that a first end thereof is connected to the vehicle body or an upper portion of the curtain airbag and a second end thereof extends from a side opposite to a side at which the auxiliary chamber is provided based on the curtain airbag and then is connected to the auxiliary chamber while extending in an oblique direction toward a front lower portion of the curtain airbag, whereby the auxiliary chamber is pulled in a front lower direction by the connection tether to be disposed at the side of the upper body of the occupant in an occupant's seating posture.

2. The curtain airbag system of claim 1, wherein the chamber moving mechanism includes:
    the connection tether configured such that a first end thereof is connected to the vehicle body or the curtain airbag and a second end thereof is connected to the auxiliary chamber; and
    a cutter provided at a vehicle body side to cut the connection tether.

3. The curtain airbag system of claim 1, wherein the connection tether is configured such that the first end thereof is connected to the upper portion of the curtain airbag behind the auxiliary chamber, and the second end thereof is connected to the auxiliary chamber by passing from a lower portion of the curtain airbag to a front of the auxiliary chamber.

4. The curtain airbag system of claim 1, wherein the curtain airbag is provided at a lower end thereof with a through-hole with the connection tether passing therethrough.

5. The curtain airbag system of claim 1, wherein the curtain airbag is provided at a lower end thereof with a planar extension chamber by extending therefrom, and
    the extension chamber is provided with a through-hole at a point on a surface thereof.

6. The curtain airbag system of claim 5, wherein the extension chamber is configured to be inflatable and to be communicable with the main chamber, thereby being inflated along with the main chamber when the main chamber is inflated.

7. The curtain airbag system of claim 5, wherein the extension chamber is configured to be disposed at the side of the upper body of the occupant at the seating mode angle of the seatback, and to be disposed closer to the occupant than the auxiliary chamber when inflated.

8. The curtain airbag system of claim 1, wherein the curtain airbag is provided with a stopper tether configured such that a first end thereof is connected to the auxiliary chamber and a second end thereof is connected to the curtain airbag while being spaced apart from the auxiliary chamber, whereby the auxiliary chamber is remained to be disposed at the side of the head of the occupant at the resting mode angle of the seatback when inflated in a state where the connection tether is cut by the chamber moving mechanism.

9. The curtain airbag system of claim 1, wherein the main chamber is inflated by being supplied with gas from an inflator, and
    the auxiliary chamber communicates with the main chamber to be inflated by being supplied with the gas from the main chamber.

10. The curtain airbag system of claim 1, wherein the main chamber and the auxiliary chamber are inflated by being supplied with gas from respective inflators,
    the respective inflators and the chamber moving mechanism are operated by control of a controller, and
    the controller receives information on the seatback angle and receives a signal in response to a vehicle collision, and is configured to operate the inflators of the main chamber and the auxiliary chamber when the signal in response to the vehicle collision is input and to control the chamber moving mechanism to cut or uncut the connection tether according to the seatback angle.

11. The curtain airbag system of claim 10, wherein the controller is configured to operate the inflators of the main chamber and the auxiliary chamber and to control the chamber moving mechanism to cut the connection tether when the signal in response to the vehicle collision is input at the resting mode angle of the seatback.

12. The curtain airbag system of claim 10, wherein the controller is configured to operate the inflators of the main chamber and the auxiliary chamber and to control the chamber moving mechanism to uncut the connection tether when the signal in response to the vehicle collision is input at the seating mode angle of the seatback.

13. The curtain airbag system of claim 1, wherein the auxiliary chamber is inflated downward to be disposed at the side of the head of the occupant at the resting mode angle of the seatback, and
    the connection tether is configured such that a first end thereof is connected to a front of the curtain airbag and a second end thereof is connected to the auxiliary chamber, whereby the auxiliary chamber is pulled in a forward direction by the connection tether to be disposed at the side of the upper body of the occupant at the seating mode angle of the seatback.

* * * * *